United States Patent
Binion et al.

(10) Patent No.: US 10,140,782 B2
(45) Date of Patent: Nov. 27, 2018

(54) VEHICLE SHARING TOOL BASED ON VEHICLE CONDITION ASSESSMENTS

(71) Applicant: STATE FARM MUTUAL AUTOMOBILE INSURANCE COMPANY, Bloomington, IL (US)

(72) Inventors: Todd Binion, Bloomington, IL (US); Kelly S. Minter, Normal, IL (US); Heidi Brown-McCreery, Bloomington, IL (US); Michael Harris, Normal, IL (US); Jeremy Myers, Normal, IL (US); Brian Fields, Normal, IL (US); Joe Harr, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 89 days.

(21) Appl. No.: 14/047,259

(22) Filed: Oct. 7, 2013

(65) Prior Publication Data

US 2015/0100505 A1    Apr. 9, 2015

(51) Int. Cl.
*G06Q 30/02* (2012.01)
*G07C 5/00* (2006.01)

(52) U.S. Cl.
CPC ......... *G07C 5/008* (2013.01); *G06Q 30/0278* (2013.01)

(58) Field of Classification Search
None
See application file for complete search history.

(56) References Cited

U.S. PATENT DOCUMENTS

| | | | |
|---|---|---|---|
| 3,702,989 A | 11/1972 | Provenzano, Jr. et al. |
| 3,866,166 A | 2/1975 | Kerscher, III et al. |
| 4,027,289 A | 5/1977 | Toman |
| 4,159,531 A | 6/1979 | McGrath |
| 4,258,421 A | 3/1981 | Juhasz et al. |

(Continued)

OTHER PUBLICATIONS

Office Action in U.S. Appl. No. 14/047,268 dated Jan. 29, 2014.

(Continued)

*Primary Examiner* — Paul R Fisher
(74) *Attorney, Agent, or Firm* — Marshall, Gerstein & Borun LLP; Randall G. Rueth

(57) ABSTRACT

A method for assessing an operator of a shared vehicle includes receiving a vehicle operator enrollment from a user, wherein the vehicle operator enrollment includes: (i) information identifying a vehicle operated by the user, and (ii) information identifying a shared vehicle. Further, the method includes retrieving condition data corresponding to the vehicle from a condition database, wherein a device inside the vehicle generates at least some of the condition data while the vehicle is being operated by the user, analyzing the condition data to determine a correlation between the user operating the vehicle and a change in a condition of the vehicle, wherein the condition of the vehicle relates to at least one of a quality or a value of the vehicle, and generating a report, wherein the report includes indications of the correlation between the user operating the vehicle and the change in the condition of the vehicle. In addition, the method includes communicating, via the computer network, the report to a remote computing device for presentation to a user.

16 Claims, 4 Drawing Sheets

(56) References Cited

U.S. PATENT DOCUMENTS

| | | | |
|---|---|---|---|
| 4,843,575 A | 6/1989 | Crane | |
| 5,361,201 A | 11/1994 | Jost et al. | |
| 5,797,134 A | 8/1998 | McMillan et al. | |
| 5,941,915 A | 8/1999 | Federle et al. | |
| 6,173,310 B1* | 1/2001 | Yost et al. | 709/201 |
| 6,289,332 B2 | 9/2001 | Menig et al. | |
| 6,434,512 B1 | 8/2002 | Discenzo | |
| 6,502,080 B1* | 12/2002 | Eichorst et al. | 705/400 |
| 6,526,335 B1* | 2/2003 | Treyz et al. | 701/1 |
| 6,661,345 B1* | 12/2003 | Bevan | G08B 21/06 |
| | | | 340/575 |
| 6,711,495 B1 | 3/2004 | Ukai et al. | |
| 7,111,005 B1 | 9/2006 | Wessman | |
| 7,174,243 B1 | 2/2007 | Lightner et al. | |
| 7,338,443 B1* | 3/2008 | Tucker | G06F 19/327 |
| | | | 128/920 |
| 7,676,306 B2 | 3/2010 | Kubo et al. | |
| 7,711,574 B2 | 5/2010 | Bradley et al. | |
| 7,765,039 B1 | 7/2010 | Hagenbuch | |
| 8,014,974 B2 | 9/2011 | Doddek et al. | |
| 8,140,358 B1 | 3/2012 | Ling et al. | |
| 8,838,324 B2 | 9/2014 | Suzuki et al. | |
| 2001/0049470 A1* | 12/2001 | Mault | A61B 5/6824 |
| | | | 600/300 |
| 2002/0065698 A1 | 5/2002 | Schick et al. | |
| 2002/0143646 A1 | 10/2002 | Boyden et al. | |
| 2002/0144233 A1 | 10/2002 | Chong et al. | |
| 2003/0009270 A1 | 1/2003 | Breed | |
| 2003/0033175 A1* | 2/2003 | Ogura | G06Q 10/02 |
| | | | 705/5 |
| 2003/0120472 A1 | 6/2003 | Lind | |
| 2004/0019517 A1 | 1/2004 | Sennott | |
| 2004/0024483 A1 | 2/2004 | Holcombe | |
| 2004/0153356 A1* | 8/2004 | Lockwood et al. | 705/9 |
| 2004/0268248 A1 | 12/2004 | Makela | |
| 2005/0154657 A1 | 7/2005 | Kim et al. | |
| 2006/0033625 A1 | 2/2006 | Johnson et al. | |
| 2006/0053075 A1 | 3/2006 | Roth et al. | |
| 2006/0114531 A1* | 6/2006 | Webb et al. | 359/15 |
| 2006/0167593 A1 | 7/2006 | Eckles | |
| 2006/0253293 A1 | 11/2006 | Osborn | |
| 2007/0043878 A1 | 2/2007 | Carlson et al. | |
| 2007/0136077 A1 | 6/2007 | Hammond et al. | |
| 2007/0179693 A1 | 8/2007 | Dukart et al. | |
| 2007/0203860 A1 | 8/2007 | Golden et al. | |
| 2008/0174451 A1* | 7/2008 | Harrington | G08B 21/06 |
| | | | 340/905 |
| 2008/0316006 A1 | 12/2008 | Bauman et al. | |
| 2009/0177352 A1 | 7/2009 | Grau et al. | |
| 2009/0327977 A1 | 12/2009 | Bachfischer et al. | |
| 2010/0106534 A1* | 4/2010 | Robinson et al. | 705/5 |
| 2010/0274571 A1 | 10/2010 | McFall | |
| 2010/0318451 A1 | 12/2010 | Niccolini et al. | |
| 2011/0012720 A1 | 1/2011 | Hirschfeld | |
| 2011/0046842 A1 | 2/2011 | Smith | |
| 2011/0251734 A1* | 10/2011 | Schepp | B60W 50/085 |
| | | | 701/1 |
| 2011/0264278 A1 | 10/2011 | Gilbert et al. | |
| 2012/0197699 A1 | 8/2012 | Snell et al. | |
| 2012/0209634 A1 | 8/2012 | Ling et al. | |
| 2012/0246036 A1 | 9/2012 | Marr et al. | |
| 2012/0262283 A1 | 10/2012 | Biondo et al. | |
| 2013/0157647 A1 | 6/2013 | Kolodziej | |
| 2014/0052501 A1 | 2/2014 | Dickson et al. | |
| 2014/0058618 A1 | 2/2014 | Rude et al. | |
| 2014/0095047 A1 | 4/2014 | Naylor | |
| 2014/0102104 A1* | 4/2014 | Read | F01D 15/04 |
| | | | 60/718 |
| 2014/0278569 A1* | 9/2014 | Sanchez | G06Q 40/08 |
| | | | 705/4 |
| 2014/0289078 A1 | 9/2014 | Paul | |
| 2014/0310186 A1 | 10/2014 | Ricci | |
| 2014/0322676 A1 | 10/2014 | Raman | |

OTHER PUBLICATIONS

Office Action in U.S. Appl. No. 14/047,279 dated Jan. 29, 2014.
Office Action in U.S. Appl. No. 14/047,256 dated Jan. 27, 2014.
Office Action in U.S. Appl. No. 14/047,274 dated Jan. 14, 2014.
Office Action in U.S. Appl. No. 14/047,274 dated Nov. 18, 2014.
Office Action in U.S. Appl. No. 14/047,256 dated Dec. 15, 2014.
Office Action in U.S. Appl. No. 14/047,268 dated Dec. 19, 2014.
Office Action in U.S. Appl. No. 14/047,279 dated Dec. 23, 2014.
Office Action in U.S. Appl. No. 14/047,274 dated Jul. 16, 2014.
CarFax Sample Report, www.CarFax.com, accessed at http://www.carfax.com/phoenix/vehicle_history/SampleReport.cfx?reportName=consumerMobileWeb, archived Nov. 2012, accessed Jul. 2014.
Office Action in U.S. Appl. No. 14/047,268 dated Aug. 1, 2014.
Office Action in U.S. Appl. No. 14/047,279 dated Aug. 7, 2014.
Office Action in U.S. Appl. No. 14/047,256 dated Aug. 13, 2014.
Office Action in U.S. Appl. No. 14/047,268 dated Mar. 26, 2015.
Office Action in U.S. Appl. No. 14/047,274 dated Apr. 9, 2015.
Office Action issued in U.S. Appl. No. 14/047,256 dated Jul. 16, 2015.
Office Action issued in U.S. Appl. No. 14/047,268 dated Jul. 9, 2015.
Office Action issued in U.S. Appl. No. 14/047,279 dated Jun. 25, 2015.
Office Action issued in U.S. Appl. No. 14/047,274 dated Dec. 4, 2015.
Office Action issued in U.S. Appl. No. 14/047,279 dated Oct. 9, 2015.
Office Action issued in U.S. Appl. No. 14/047,256 dated Dec. 30, 2015.
Office Action issued in U.S. Appl. No. 14/047,268 dated Dec. 22, 2015.
Office Action issued in U.S. Appl. No. 14/047,268 dated Apr. 29, 2016.
Office Action issued in U.S. Appl. No. 14/047,256 dated Dec. 16, 2016.
Office Action issued in U.S. Appl. No. 14/047,256 dated Jun. 6, 2016.
Office Action issued in U.S. Appl. No. 14/047,274 dated Sep. 2, 2016.
Office Action issued in U.S. Appl. No. 14/047,274 dated Jan. 18, 2017.
Office Action issued in U.S. Appl. No. 14/047,274 dated May 3, 2017.
Office Action issued in U.S. Appl. No. 14/047,256 dated Oct. 26, 2017.
Office Action issued in U.S. Appl. No. 14/047,274 dated Sep. 20, 2017.

* cited by examiner

VEHICLE SHARING TOOL BASED ON VEHICLE CONDITION ASSESSMENTS

TECHNICAL FIELD

The present disclosure generally relates to assessing the condition of a vehicle and, more particularly, to a method for gathering and analyzing condition related data.

BACKGROUND

Often vehicle owners are unable to accurately assess the current condition of the vehicles they own, because the only information available is maintenance/repair records or vehicle gauge readings. It is impossible to accurately assess the condition of a vehicle from such general information, and, as a result, vehicle owners are often faced with unexpected repair costs, abnormal vehicle behavior, and/or unnecessary vehicle depreciation. Vehicle owners who would address potential vehicle issues, if aware of any issues, are unable to proactively avoid mechanical problems and/or vehicle depreciation because of a lack of relevant information.

Moreover, widely used vehicle sharing services, such as vehicle rental or leasing services, carpooling or vanpooling services, ride sharing services, etc., have no easy way to determine the correlation between changes in vehicle condition and individual drivers. Operation of shared vehicles by certain drivers may result in expensive maintenance/repair costs, while the operation of shared vehicle by other drivers, who pay the same or a similar vehicle sharing charge, results in minimal maintenance costs. Even so, a vehicle sharing service has no easy way of determining how a shared vehicle is driven (e.g. severe acceleration and braking, towing a trailer, etc.), where the shared vehicle is driven (rural areas, urban areas, the "salt belt," etc.), and under what conditions was the shared vehicle driven (e.g. traffic, highway, snow, etc.).

SUMMARY

In one embodiment, a computer-implemented method for assessing an operator of a shared vehicle comprises receiving, via a computer network, a vehicle operator enrollment from a user, wherein the vehicle operator enrollment includes: (i) information identifying a vehicle operated by the user, and (ii) information identifying a shared vehicle. Further, the method comprises retrieving, with one or more processors, condition data corresponding to the vehicle from a condition database, wherein a device inside the vehicle generates at least some of the condition data while the vehicle is being operated by the user, analyzing, with one or more processors, the condition data to determine a correlation between the user operating the vehicle and a change in a condition of the vehicle, wherein the condition of the vehicle relates to at least one of a quality or a value of the vehicle, and generating a report, with one or more processors, wherein the report includes indications of the correlation between the user operating the vehicle and the change in the condition of the vehicle. Still further the method comprises communicating, via the computer network, the report to a remote computing device for presentation to a user.

In another embodiment, a computer-implemented method for reporting vehicle ownership information to a customer via a computing device, including a user interface and a display device, comprises receiving, via the user interface, information identifying a shared vehicle, generating, with one or more processors, an operator query, wherein the operator query includes the information identifying the shared vehicle, and sending, via a network interface at the computing device, the operator query to a server. Further, the method comprises receiving, via the network interface at the computing device, a report indicating a correlation between a user operating a vehicle and a change in a condition of the vehicle, wherein the condition of the vehicle relates to at least one of a quality or a value of the vehicle, wherein the vehicle operator report is based on a collective analysis of a plurality of condition data, and wherein a device inside the vehicle generates at least some of the plurality of condition data while the vehicle is being operated by the user. Still further, the method comprises presenting, via the display device, at least some of the report, rendering, with one or more processors, an image of the vehicle operator report for presentation to the customer, and, in response to the presentation of at least part of the vehicle operator report, receiving, via the user interface, instructions regarding the sharing of the shared vehicle.

In yet another embodiment, a computer device for assessing an operator of a shared vehicle comprises one or more processors and one or more non-transitory memories coupled to the one or more processors, wherein the one or more memories include computer executable instructions stored therein that, when executed by the one or more processors, cause the one or more processors to: receive, via a computer network, a vehicle operator enrollment from a user, wherein the vehicle operator enrollment includes: (i) information identifying a vehicle operated by the user, and (ii) information identifying a shared vehicle and retrieve, with one or more processors, condition data corresponding to the vehicle from a condition database, wherein a device inside the vehicle generates at least some of the condition data while the vehicle is being operated by the user. Further, when executed by the one or more processors, the computer executable instructions cause the one or more processors to: analyze, with one or more processors, the condition data to determine a correlation between the user operating the vehicle and a change in a condition of the vehicle, wherein the condition of the vehicle relates to at least one of a quality or a value of the vehicle, generate a report, with one or more processors, wherein the report includes indications of the correlation between the user operating the vehicle and the change in the condition of the vehicle, and communicate, via the computer network, the report to a remote computing device for presentation to a user.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As used herein, the term "vehicle" may refer to any of a number of motorized transportation devices. A vehicle may be a car, truck, bus, train, boat, plane, etc. Additionally, as used herein, the term "driver" may refer to any operator of a vehicle. A driver may be a car driver, truck driver, bus driver, train engineer, captain of a boat, pilot of an airplane, etc.

System Overview

Figure 1:
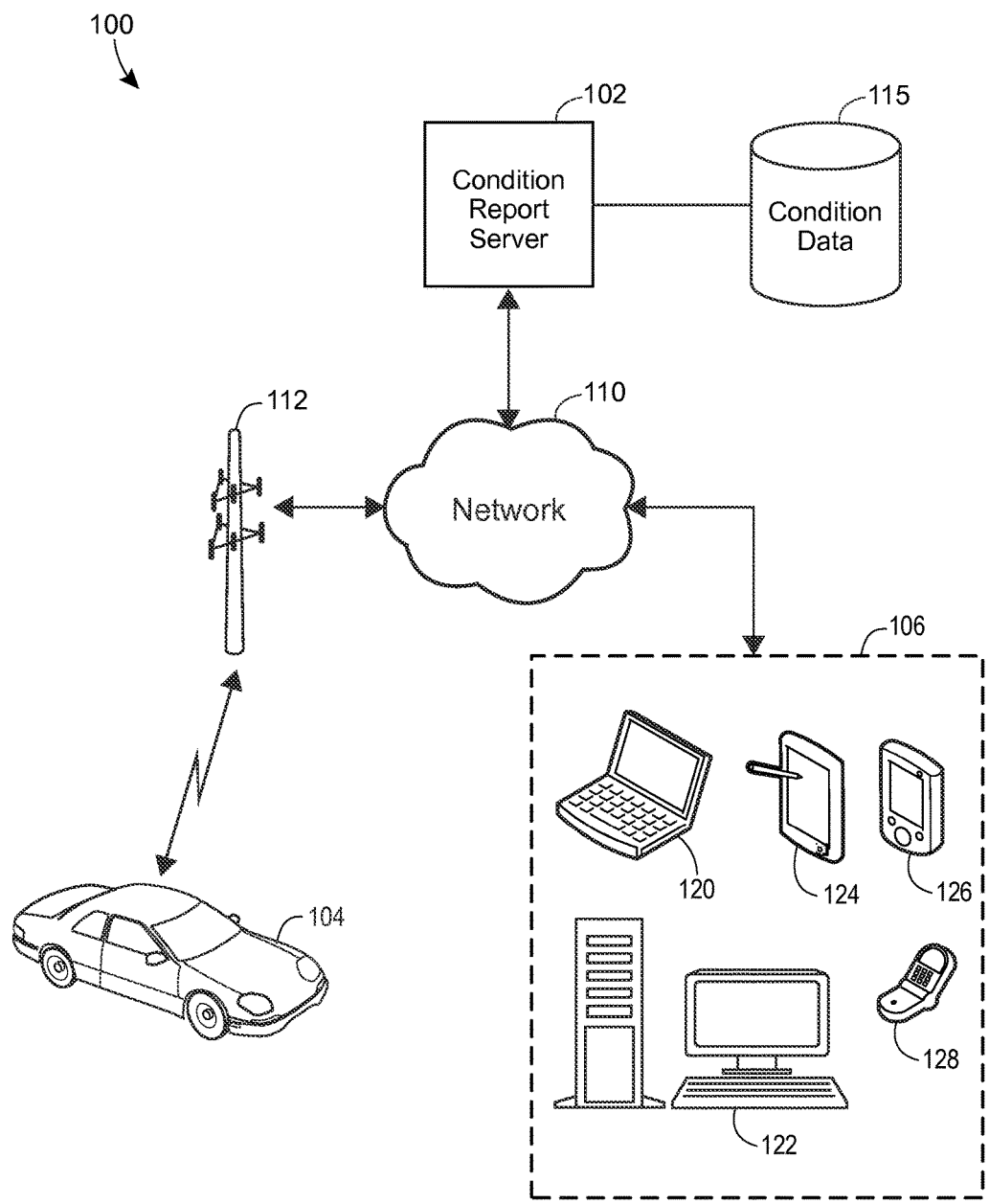
FIG. 1 illustrates an example system in which a condition report server may assess the condition of a vehicle.

FIG. 1 illustrates an example system 100 in which the correlation between changes in the condition of a vehicle 104 and operation of the vehicle 102 by a specific vehicle operator can be assessed. A condition report server 102 and one or more end user devices 106 are communicatively coupled to a network 110. Additionally, the vehicle 104 is communicatively coupled to the network 110 via an antenna 112. The network 110 may be a proprietary network, a secure public internet, a virtual private network or some other type of network, such as dedicated access lines, plain ordinary telephone lines, satellite links, combinations of these, etc. Where the network 110 comprises the Internet, data communications may take place over the network 110 via an Internet communication protocol. Further details of an example condition report server and an example end user device are described with reference to FIG. 2 and FIG. 3, respectively.

In some implementations, the vehicle 104 (which may be a shared vehicle, a vehicle owned by a user of the one or more end user devices 106, etc., for example) uploads condition data to the condition report server 102 via the network 110. For example, an on-board computing device (not shown) or end user device disposed in the vehicle 104 may wirelessly upload data from braking, acceleration, motion, force, environment, image, etc. sensors, via one or more wireless interfaces (not shown), for assessing correlation between changes in the condition of a vehicle 104 and operation of the vehicle 102 by a specific vehicle operator. In turn, the condition report server 102 may store the condition data in a condition database 115 that is communicatively coupled to the condition report server 102. The condition database 115 may include an assortment of computer-readable media. By way of example and without limitation, computer-readable media may include both volatile and nonvolatile media, removable and non-removable media.

Although the example system 100 is shown to include one condition report server 102 and five end user devices 106, it is understood that different numbers of servers and end user devices may be utilized. Furthermore, the processing performed by the condition report server 102 may be distributed among a plurality of servers in an arrangement known as "cloud computing," in an implementation. This configuration may provide several advantages, such as enabling near real-time uploads and downloads of information as well as periodic uploads and downloads of information, for example.

Figure 2:
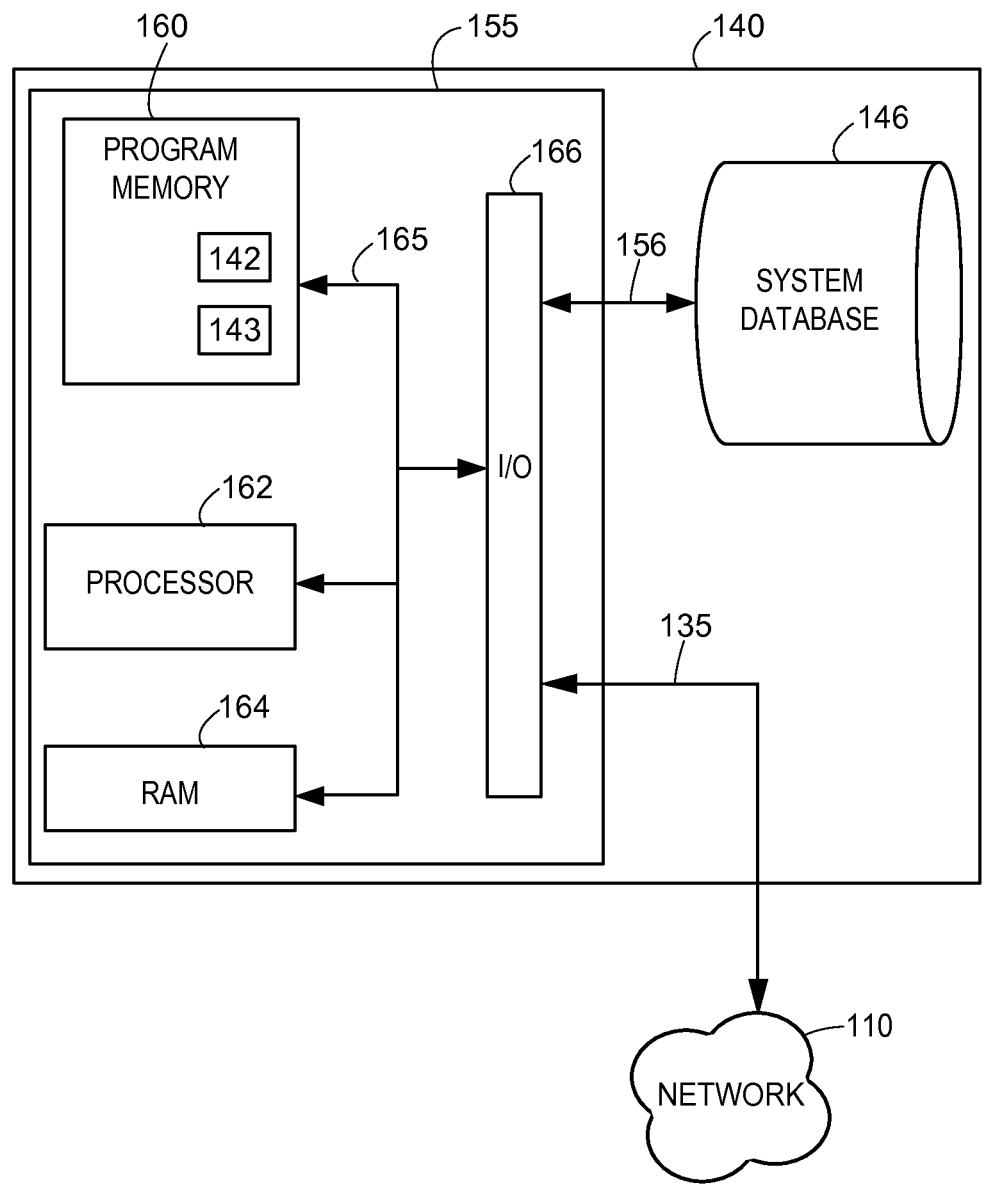
FIG. 2 illustrates an example server that can be implemented as the condition report server illustrated in FIG. 1.

FIG. 2 illustrates an example server 140 that may be implemented as a condition report server, such as the condition report server 102. The example server 140 includes a controller 155 that is operatively connected to the database 146 via a link 156, and it should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165. The program memory 160 may be configured to store computer-readable instructions that when executed by the processor 162 cause the server 140 to implement a server application 142 and a web server 143. The instructions for the server application 142 may cause the server 140 to implement the methods described herein.

While shown as a single block in FIG. 2, it will be appreciated that the server application 142 may include a number of different programs, modules, routines, and subroutines that may collectively cause the server 140 to implement the server application 142. It should be appreciated that although only one microprocessor 162 is shown, the controller 155 may include multiple microprocessors 162. Similarly, the memory of the controller 155 may include multiple RAMs 164 and multiple program memories 160. Further, while the instructions for the server application 142 and web server 143 are shown being stored in the program memory 160, the instructions may additionally or alternatively be stored in the database 146 and/or RAM 164. Although the I/O circuit 166 is shown as a single block, it should be appreciated that the I/O circuit 166 may include a number of different types of I/O circuits. The RAM(s) 164 and program memories 160 may be implemented as semiconductor memories, magnetically readable memories, and/or optically readable memories, for example. The controller 155 may also be operatively connected to the network 130 via a link 135.

Figure 3:
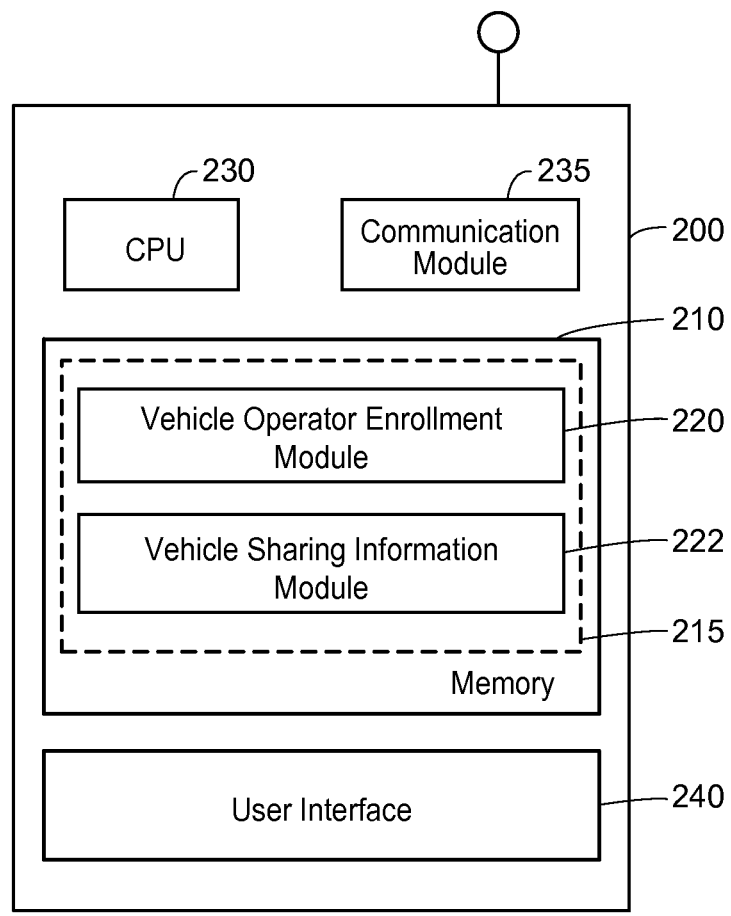
FIG. 3 illustrates an example end user device that can be implemented as one of the end user devices illustrated in FIG. 1.

FIG. 3 illustrates an example end user device 200 capable of reporting vehicle sharing information to a customer, as discussed below. The end user device 200 may be implemented as one of the end user devices 106, for example. The end user device 200 includes a computer readable memory 210 in the form of volatile and/or nonvolatile memory such as read only memory (ROM) and random access memory (RAM). The memory 210 may store a vehicle sharing tool 215 including a vehicle operator enrollment module 220 and a vehicle sharing information module 222 to be executed by a CPU 230. In one implementation, the vehicle sharing tool 215 may be available at an online application store disposed at an application server (not shown), for example. A user may retrieve a copy of the vehicle sharing tool 215 from the server and "install" the retrieved copy of the vehicle sharing tool 215 on the end user device 200.

In other implementations, the end user device 200 is capable of executing a graphical interface (GUI) for an online vehicle sharing tool within a web browser application, such as Apple's Safari®, Google Android™ mobile web browser, Microsoft Internet Explorer®, etc. The web browser application may be implemented as a series of machine-readable instructions for receiving, interpreting, and displaying web page information (e.g. from web server 143) while also receiving inputs from the user.

Further, the portable device 200 includes a communication module 235, that facilitates wireless communication for data exchange over a mobile and/or wide area network, and a user interface 240. The user interface may include devices to receive inputs from a user, such as a keyboard, touch-screen, buttons, trackballs, etc., and display devices, such as liquid crystal displays (LCD), light emitting diodes (LED), organic light-emitting diodes (OLED), ePaper displays, etc.

Vehicle Operator Assessment

Figure 4:
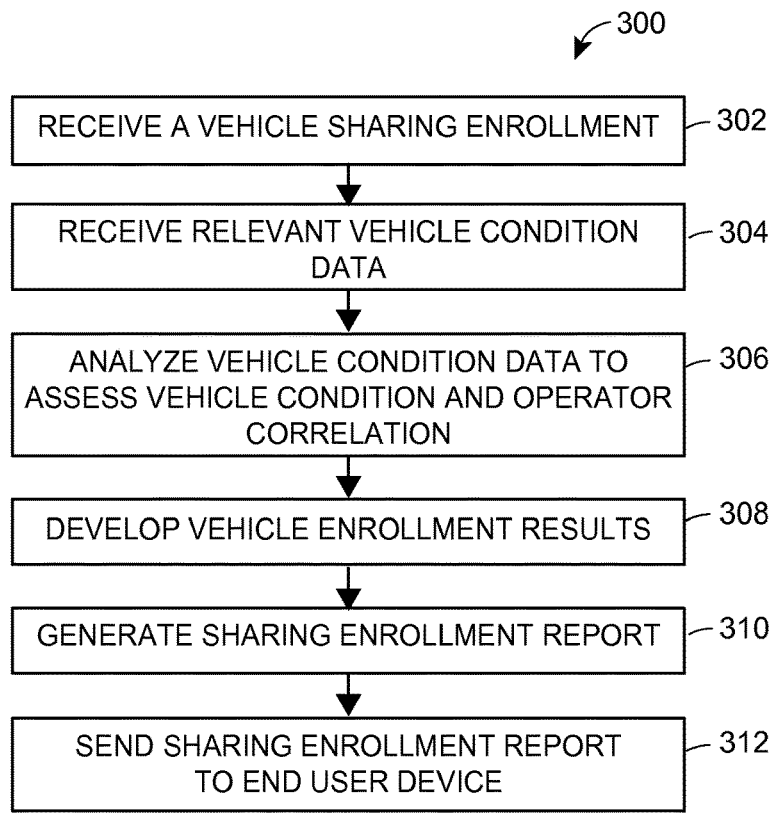
FIG. 4 is a flow diagram of an example method for assessing the correlation between changes in the condition of a vehicle and operation of the vehicle by individual drivers.

FIG. 4 is a flow diagram of an example method 300 for assessing the correlation between changes in the condition of a vehicle and operation of the vehicle by a specific vehicle operator. The method 300 may be implemented in the condition report server 102, for example.

To begin, a vehicle operator enrollment is received from an end user device (block 302). In one scenario, a user of one of the end user devices 106, wishing to participate in a vehicle sharing service, may submit the vehicle operator enrollment as part of an application/registration process for the vehicle sharing program. The user may input, via a user interface on the one or more end user device 106, information identifying the user and a vehicle operated by the user. For example, the information identifying the vehicle may include a license plate number, license plate state, manufacturer name, model name or number, color, vehicle identification number (VIN), registered owner name, owner contact information, insurance policy number, etc, and the information identifying the user may include a name, personal identification number (PIN), picture, etc. In turn, the one of the end user devices 106 may send a vehicle operator enrollment, including the information identifying the vehicle and user, to the condition report server 102, in the example scenario.

Upon receiving the vehicle operator enrollment, condition data corresponding to the identified vehicle is retrieved from a vehicle condition database (block 304), such as condition database 115. In some implementations, the condition data may include data gathered from a variety of data sources, as described in U.S. application Ser. No. 13/897,646 entitled "Systems and Methods to Identify and Profile a Vehicle Operator" and filed on May 20, 2013, the entire disclosure of which is hereby incorporated by reference herein. By way of example and without limitation, such data sources may include: (i) sensors installed in vehicles, such as braking/acceleration/cornering sensors, tire pressure sensors, cameras, microphones, engine temperature sensors, mileage sensors, clocks, etc., (ii) sensors in mobile devices (e.g. smartphones, tablet computers, geopositioning receivers, etc.), where the mobile devices are temporarily disposed in vehicles, and (iii) third party databases (e.g. public record databases, insurance databases, etc.).

In some implementations, the condition data corresponding to the vehicle may be immediately descriptive of vehicle condition or descriptive of vehicle condition after manipulation. For example, data indicating vehicle mileage, year, and previous collisions/incidents may be immediately descriptive of the condition of a vehicle. On the other hand, engine rotations per minute (RPM), braking profiles, and geographic locations are example types of data that may be descriptive of the condition of a vehicle only after manipulation. In one scenario, an analysis of engine RPM data may indicate that a vehicle is frequently used for towing a trailer, and towing a trailer may be associated with vehicle depreciation and/or high maintenance costs, example indications of vehicle condition.

In some implementations, owners or operators of vehicles may receive incentives for contributing condition data, for storage in a condition database. For example, car dealerships may offer more money to buy a car that has corresponding condition data recorded over the life of the car, as compared with a car that has no recorded condition data. In another example, an insurance company may provide coupons, discounts, or other rewards to customers that contribute condition data from insured vehicles.

The condition data stored in the condition database 115 may, in some implementations, be protected against fraud. For example, the condition data collected from used vehicles may be collected in real-time (i.e. wirelessly communicated to the condition server 102 immediately after being generated) and stored in a secure database (e.g. protected by authentication, encryption, etc.). In such a way, vehicle operators, or other interested persons, are prevented from modifying vehicle condition data to inaccurately reflect good/bad vehicle conditions.

Returning to FIG. 4, the condition data, retrieved from a vehicle condition database, is analyzed to assess the condition of the vehicle and correlations between changes in the condition of the vehicle and vehicle operation by an operator identified in the vehicle operator enrollment (block 306), in an implementation. For example, the condition report server 102 may analyze the condition data to assess the condition, and changes in the condition, of the vehicle in relation to quality and value (e.g. maintenance, longevity, cost of ownership, mechanical operation, aesthetic condition, etc.).

In a simple example scenario, the condition report server 102 may retrieve geopositioning data, acceleration/braking/cornering data, and maintenance history data from the condition database 115. The maintenance history data may indicate that a vehicle has a history free of frequent or severe maintenance/repair issues. However, the geopositioning data may indicate that the vehicle has primarily been driven in the "salt belt" region of the United States (a region where vehicles commonly encounter corrosion due to the use of road salt) and the acceleration/braking/cornering data may indicate erratic and severe acceleration, braking, and/or cornering (i.e. reckless driving). In such an example scenario, the condition report server 102 may assess the condition of the vehicle as relatively low quality/value because of probable current and/or future issues caused by the driving environment and driving behavior.

An analysis only considering the maintenance history and general vehicle information (e.g. mileage, make, model, year, etc.) may overvalue the used car, in the above scenario. In contrast, the techniques of the present disclosure are able to provide an accurate assessment of vehicle quality by collectively analyzing condition data gathered from the vehicle over time, such as the geopositioning and acceleration/braking/cornering data in the above scenario, for example.

In some implementations, the condition report server 102 may collectively or comparatively analyze the condition data to assess vehicle condition. For example, mileage data may indicate a relatively high mileage (e.g. 100,000 miles as compared with an average of 75,000 miles for cars of the same year), whereas geopositioning data may indicate that the vehicle is predominately driven in rural areas of the state of Arizona. Independently, the high mileage may indicate low quality or value. However, when combined with geopositioning data, from which one could infer mostly highway driving (i.e. rural driving) in a dry climate (Arizona), the condition report server 102 may more moderately assess the vehicle quality and value, in the example case.

The condition report server 102 may assess both the past and future condition of the vehicle in addition to the current condition of the vehicle, in some implementations. The condition report server 102 may use prediction, modeling, simulation, or other suitable algorithms to infer a condition of a vehicle at times in the past and predict conditions of a vehicle in the future, for example. A prediction algorithm (e.g. trained on reference data) may predict that a certain vehicle will need brake replacement in one year, transmission service in two years, and tire replacement in one and a half years, in an example scenario.

Also, the condition report server 102 may use prediction, modeling, etc. algorithms to accurately assess the current condition of a vehicle, even when condition data is not available over the entire life, or age, of the vehicle. For example, condition data may be available for only five out of ten years of the life of a vehicle. In such a case, a simulation/modeling algorithm may stitch together the available data with simulations to provide an accurate assessment of current vehicle condition.

In an implementation, the condition report server 102 may use the condition data, gathered at various times in which the vehicle was operated, to determine a vehicle condition trend. The vehicle condition trend may identify time frames in which the condition of the vehicles experienced significant change, such as a period of six months in which operation of the vehicle included frequently severe acceleration, braking, and cornering. Moreover, the condition report server 102 may cluster the condition data and thus portions of the vehicle condition trend into groups each associated with a specific operator of the vehicle 104, such as the clustering described in U.S. application Ser. No. 13/897,650 entitled "Risk Evaluation Based on In-cabin Driver Behavior" and filed on May 20, 2013, the entire disclosure of which is hereby incorporated by reference herein. In such a way, the condition report server 102 may identify correlations between changes in the condition of the vehicle 104 and a user of one of the end user devices 106 (i.e. the sender of the vehicle operator enrollment).

In an example scenario, the condition report server 102 may identify three time frames in which the vehicle 104 experienced significant changes in condition. The three time frames may include: (i) a time frame in which the vehicle 104 was used primarily for towing or carrying heavy loads (e.g. concluded via an analysis of engine RPM data) changing the mechanical condition of the engine, (ii) a time frame in which the vehicle 104 had a vehicle collision incident and two traffic violations (e.g. concluded via an analysis of public record data) changing the aesthetic and/or mechanical condition of the vehicle, and (iii) a time frame in which the vehicle operator or passengers frequently ate food in the vehicle 104 (e.g. concluded via an analysis of three dimensional motion sensing data) changing the interior condition of the vehicle.

Out of these three time frames, in the example scenario, the condition report server 102 may identify the time frames (i) and (iii) as corresponding to vehicle operation by the sender of the vehicle operator enrollment and time frame (ii) as corresponding to vehicle operation by another vehicle operator. Thus, the condition report server 102 may assess the correlation between changes in the condition of a vehicle 104 and operation of the vehicle 102 by a specific vehicle operator. After the assessment of condition, vehicle enrollment results are developed based on the correlations between changes in the condition of the vehicle and vehicle operation by an operator identified in the vehicle operator enrollment (block 308). The vehicle enrollment results may include vehicle sharing charge/rates, enrollment rejections, etc., for example.

In some implementations, the condition report server 102 may compare the correlations assessed at block 306 to a plurality of other assessments and/or reference data to determine a relative score or grade for the vehicle operator. For example, the score or grade for the vehicle operator may be a number between one and one hundred representing the relative correlation between the operation of a vehicle by the vehicle operator and changes in vehicle condition. In this example case, a score of one hundred may indicate a high correlation between operation of a vehicle by a specific vehicle operator and vehicle depreciation, and a score of one may indicate almost no correlation. The condition report server 102 may then generate a charge for a specific vehicle operator based on the grade or score of the operator, where operators with a high score may be charged more for vehicle sharing as compared with operators with a low score, for example.

The condition report server 102 may also generate an enrollment rejection or acceptance in response to the assessment of block 306. For example, vehicle operators highly correlated with negative changes in vehicle condition may be rejected for enrollment in a vehicle sharing service. On the other hand, vehicle operators negligibly, or only slightly, correlated with negative changes in vehicle condition may be accepted for enrollment in the vehicle sharing service. The condition report server 102 may generate a score or grade, as discussed above, and a vehicle operator may be accepted or rejected based on a threshold score or grade, for example.

In some implementations, the vehicle enrollment results may be updated based on newly captured condition data. For example, an operator may enroll in a vehicle sharing service with an initial rate based on an initial assessment of correlation between the operator and changes in vehicle condition. Then, as the operator operates a shared vehicle, or other vehicle, from which condition data is being gathered, the assessment and corresponding enrollment results may be updated, for example. In some cases, vehicle sharing rates/charges may increase or decrease and/or operators may lose/gain vehicle sharing privileges based on newly captured condition data.

Next, a vehicle sharing enrollment report is generated to be presented on an end user device (block 310). In some implementations, the vehicle sharing enrollment report includes indications of some or all of the vehicle enrollment results developed at block 308. For example, the condition report server 102 may generate a vehicle sharing enrollment report in the form of one or more web pages including at least some of the vehicle enrollment results, where the web pages may be displayed via a web browser application executed on the one or more end user devices 106.

In some implementations, the vehicle sharing enrollment report is interactive. For example, the condition report server 102 may develop a vehicle sharing enrollment report in the form of one or more interactive web pages or in the form of content for an interactive vehicle sharing application. An initial web page may display a general indication of correlations between changes in vehicle condition and operation of the vehicle by a vehicle operator, such as a series of scores or ratings. Upon user selection of a score or rating, further or modified web pages may display more detailed information, such as graphs, tables, etc. or even portions of the raw condition data itself, for example.

Finally, the vehicle sharing enrollment report is sent to an end user device for presentation to a user (block 312). In some implementations, the condition report server 102 may initially send a partial vehicle sharing enrollment report to the end user device, and then, based on user interaction with the report, the condition report server 102 may send additional portions of the vehicle sharing enrollment report. Further, the condition report server 102 may generate and send variations of the vehicle sharing enrollment report based on end user device configurations, in an implementation. For example, the condition report server may generate one variation of a vehicle sharing enrollment report for a visually appealing display on a smartphone and another variation of a vehicle sharing enrollment report for a visually appealing display on a tablet, laptop, or desktop computer.

Vehicle Sharing Enrollment Tool

Figure 5:
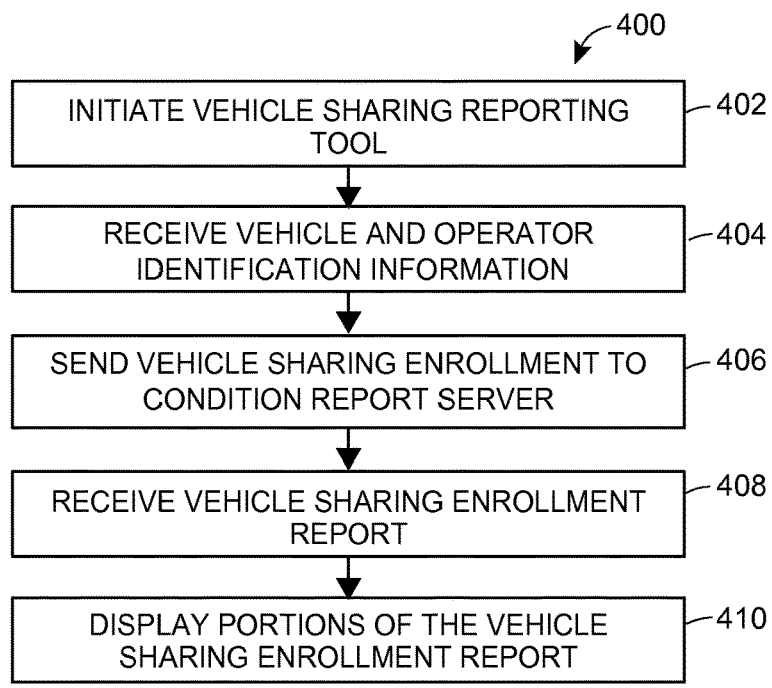
FIG. 5 is a flow diagram of an example method for reporting vehicle sharing information.

FIG. 5 is a flow diagram of an example method 400 for reporting enrollment results, for enrollment in a vehicle sharing service, on an end user device. The method 440 may be implemented by the one or more end user devices 106, for example.

To begin, a vehicle sharing tool is initiated (block 402). In one implementation, one of the end user devices 106 may execute a vehicle sharing tool stored in memory (e.g. the vehicle sharing tool 215), where the vehicle sharing tool facilitates communications with the condition report server 102 and the display of vehicle enrollment results. In another implementation, a user of one of the end user devices 106 may initiate a vehicle sharing tool via a web browser application.

Next, user identification information and vehicle identification information is received via a user interface (block 404), such as the user interface 240. In some implementations, one of the end user devices 106 may display a series of forms, questions, buttons, etc. to prompt a user of one of the end user devices 106 to enter user/vehicle identification information. For example, one of the end user devices 106 may display a text box for entering a VIN number and a "continue" button such that the user may enter the VIN number via a keyboard or touchscreen and tap or click the continue button to confirm the identification information.

In another implementation, a user of an end user device may use sensors in the device itself to automatically generate vehicle identification information. For example, a camera on a smartphone may capture an image of a license plate or scan a bar code representing a VIN number. In such a case, the end user device may analyze the automatically generated data and, in some implementations, transform the data into convenient formats (e.g. text, numbers, etc.) for vehicle identification.

Once vehicle identification information is received, a vehicle sharing enrollment is sent to a condition report server (block 406). The vehicle sharing enrollment includes the vehicle identification and user identification information, and, in some implementations, the vehicle sharing enrollment includes device specific information. For example, the vehicle sharing enrollment may include device specific information indicating device configurations (e.g. hardware, software, etc.), device users (e.g. usernames, passwords, identification numbers, etc.), device locations, etc.

Returning to FIG. 5, a vehicle sharing enrollment report is received in response to the vehicle sharing enrollment (block 408). For example, the condition report server 102 may electronically communicate the vehicle sharing enrollment report to one of the end user devices as web content for display in a vehicle sharing tool or web browser. In addition, the condition report server 102 may send the vehicle sharing enrollment report via email, text message, or hyperlink, for example.

In some implementations, the condition report server 102 may use device specific information to customize vehicle sharing enrollment reports. For example, the condition report server may use a device location to generate a vehicle sharing enrollment report including rates for multiple vehicle sharing services or multiple shared vehicles within a certain geoblock of the device location.

Upon receiving the vehicle sharing enrollment report, all or part of the vehicle sharing enrollment report is displayed (block 410). For example, one of the end user devices 106 may display interactive web pages or other interactive vehicle sharing enrollment content, as described with reference to FIG. 4. In some implementations, one of the end user devices 106 may download or view the vehicle sharing enrollment report as a document, such as a portable document format (PDF) document, Microsoft Excel® spreadsheet, or other suitable document. For example, one of the end user device 106 may save a vehicle sharing enrollment report document in computer-readable memory or print a vehicle condition report document for later viewing. Also, a user may "share" part or all of a vehicle condition report with friends, potential buyers, etc. via email, text message, hyperlink, Facebook® post-, etc., in some implementations,

We claim:

1. A computer-implemented method for assessing potential operators of a shared vehicle comprising:

receiving, via a computer network, a vehicle operator enrollment from a user, wherein the vehicle operator enrollment includes: (i) information identifying an operated vehicle, the operated vehicle operated by the user in the past, and (ii) information requesting future use of the shared vehicle, wherein the shared vehicle is different from the operated vehicle;

retrieving, by one or more processors, condition data corresponding to the operated vehicle from a condition database, the condition data including a plurality of points in time, a current condition of the operated vehicle at each of the plurality of points in time, and an indication of an operator of the operated vehicle at each of the plurality of points in time, wherein a plurality of devices inside the operated vehicle generated at least some of the condition data while the operated vehicle was being operated by the user, the plurality of devices including a motion sensor;

wherein the condition data includes movement data within the operated vehicle collected by the motion sensor;

analyzing, by the one or more processors, the condition data to identify a user operated cluster corresponding to a first subset of the plurality of points in time wherein the condition data indicates that the operated vehicle was operated by the user;

analyzing, by the one or more processors, the movement data within the user operated cluster to determine that the user or a passenger was eating food in the operated vehicle;

determining, by the one or more processors, a correlation between the user operating the operated vehicle and a change in a condition of the operated vehicle by identifying a change in the current condition of the operated vehicle over the first subset of the plurality of points in time within the user operated cluster, wherein the change in the condition of the operated vehicle includes:
- (i) a depreciation of the operated vehicle based on a presence of food within the operated vehicle, wherein the depreciation indicates a change in at least one of a market value or a trade-in value of the operated vehicle, and
- (ii) a change in interior condition of the operated vehicle based on the presence of food within the operated vehicle;

generating a report, by the one or more processors, wherein the report includes a visual representation of the correlation between the user operating the operated vehicle and the change in the condition of the operated vehicle; and communicating, via the computer network, the report to a remote computing device for presentation to a party authorized to grant the requested future use of the shared vehicle.

2. The computer-implemented method of claim 1, wherein at least one of the information identifying the operated vehicle includes at least one of a license plate number, license plate state, manufacturer name, year of manufacture, name of insurance company, model name or number, color, vehicle identification number (VIN), registered owner name, owner contact information, or insurance policy number.

3. The computer-implemented method of claim 1, wherein the condition data includes one or more of indications of current or prior geographic locations, mileages of the operated vehicle, times, dates, behaviors of the user while operating the operated vehicle, collisions in which the operated vehicle was involved, repairs of the operated vehicle, information from a vehicle title corresponding to the operated vehicle, usage patterns of the operated vehicle, recalls corresponding to the operated vehicle, preferences of the user, or driving violations.

4. The computer-implemented method of claim 1, wherein the plurality of devices inside the operated vehicle includes an on-board vehicle computer.

5. The computer-implemented method of claim 1, wherein the shared vehicle is a rental vehicle.

6. The computer-implemented method of claim 1, wherein the shared vehicle is used as part of a car sharing, carpooling, or ride sharing service.

7. The computer-implemented method of claim 1, wherein analyzing the condition data to determine a correlation between the user operating the operated vehicle and a change in a condition of the operated vehicle includes:
determining, by the one or more processors, the condition of the operated vehicle operated at a point in time for which the condition data is available; and
executing a simulation algorithm by the one or more processors to predict or simulate the condition of the operated vehicle at the current point in time or a future point in time.

8. The computer-implemented method of claim 7, wherein executing the simulation algorithm by the one or more processors to predict or simulate the condition of the operated vehicle at the current point in time or the future point in time includes at least one of:
- (i) predicting a current or future market value of the operated vehicle,
- (ii) predicting a current or future need for maintenance or repair of the operated vehicle, or
- (iii) developing suggestions for improving a quality or a value of the operated vehicle.

9. A computer-implemented method for reporting vehicle ownership information to a customer via a computing device including a user interface and a display device, the method comprising:
receiving, via the user interface, a request for a future use of a shared vehicle from a user who previously operated a monitored vehicle different from the shared vehicle;

generating, by one or more processors, an operator query, wherein the operator query includes information identifying the monitored vehicle;

sending, via a network interface at the computing device, the operator query to a server;

in response to sending the operator query, receiving, via the network interface at the computing device, a vehicle operator report indicating a correlation between the user operating the monitored vehicle and a change in a condition of the monitored vehicle,
wherein the change in the condition of the monitored vehicle includes: (i) a depreciation of the monitored vehicle based on a presence of food within the monitored vehicle, wherein the depreciation indicates a change in at least one of a market value or a trade-in value of the operated vehicle, and (ii) a change in interior condition of the monitored vehicle based on the presence of food within the monitored vehicle, wherein the vehicle operator report is based on a collective analysis of a plurality of condition data, the plurality of condition data including a plurality of points in time, a current condition of the monitored vehicle at each of the plurality of points in time, and an indication of an operator of the monitored vehicle at each of the plurality of points in time, wherein the plurality of condition data is analyzed to identify a user operated cluster corresponding to a first subset of the plurality of points in time wherein the condition data indicates that the monitored vehicle was operated by the user, and the correlation between the user operating the monitored vehicle and the change in the condition of the monitored vehicle is determined based on a change in the current condition of the monitored vehicle over the first subset of the plurality of points in time within the user operated cluster, wherein a plurality of devices inside the monitored vehicle generated at least some of the plurality of condition data while the monitored vehicle was being operated by the user, the plurality of devices including a motion sensor wherein the condition data includes movement data within the monitored vehicle collected by the motion sensor wherein the movement data is analyzed within the user operated cluster to determine that the user or a passenger was eating food in the monitored vehicle;

rendering, by the one or more processors, an image of the vehicle operator report for presentation to the customer on the display device; and in response to the presentation of the image on the display device, receiving, via the user interface, instructions regarding the sharing of the shared vehicle.

10. The computer-implemented method of claim 9, wherein the information identifying the monitored vehicle includes at least one of a license plate number, license plate state, manufacturer name, year of manufacture, name of insurance company, model name or number, color, vehicle identification number (VIN), registered owner name, owner contact information, or insurance policy number.

11. The computer-implemented method of claim 9, wherein the instructions regarding the sharing of the shared vehicle include a rejection or an acceptance of the user to operate the shared vehicle.

12. The computer-implemented method of claim 11, further comprising:

when the instructions regarding the sharing of the shared vehicle include the rejection of the user to operate the shared vehicle, sending an indication of the rejection to the server; and when the instruction regarding the sharing of the shared vehicle include the acceptance of the user to operate the shared vehicle, sending an indication of the acceptance to the server.

13. The computer-implemented method of claim 9, wherein the instructions regarding the sharing of the shared vehicle include an indication of a specific rate for shared use of the shared vehicle for the user.

14. The computer-implemented method of claim 13, further comprising sending an indication of the specific rate to the server.

15. The computer-implemented method of claim 14, further comprising receiving a rate acceptance or counter rate offer in response to sending the indication of the specific rate to the server.

16. A computer device for assessing an operator of a shared vehicle, the computer device comprising:

one or more processors; and one or more non-transitory memories coupled to the one or more processors;

wherein the one or more memories include computer executable instructions stored therein that, when executed by the one or more processors, cause the one or more processors to:

receive, via a computer network, a vehicle operator enrollment from a user, wherein the vehicle operator enrollment includes: (i) information identifying an operated vehicle, the operated vehicle operated by the user in the past, and (ii) information requesting future use of the shared vehicle, wherein the shared vehicle is different from the operated vehicle;

retrieve condition data corresponding to the operated vehicle from a condition database, the condition data including a plurality of points in time, a current condition of the operated vehicle at each of the plurality of points in time, and an indication of an operator of the operated vehicle at each of the plurality of points in time, wherein a plurality of devices inside the operated vehicle generated at least some of the condition data while the operated vehicle was being operated by the user, the plurality of devices including a motion sensor;

wherein the condition data includes movement data within the operated vehicle collected by the motion sensor;

analyze the condition data to identify a user operated cluster corresponding to a first subset of the plurality of points in time wherein the condition data indicates that the operated vehicle was operated by the user;

analyze the movement data within the user operated cluster to determine that the user or a passenger was eating food in the operated vehicle;

determine a correlation between the user operating the operated vehicle and a change in a condition of the operated vehicle by identifying a change in the current condition of the operated vehicle over the first subset of the plurality of points in time within the user operated cluster, wherein the change in the condition of the operated vehicle includes:

(i) a depreciation of the operated vehicle based on a presence of food within the operated vehicle, wherein the depreciation indicates a change in at least one of a market value or a trade-in value of the operated vehicle, and (ii) a change in interior condition of the operated vehicle based on the presence of food within the operated vehicle;

generate a report, wherein the report includes a visual representation of the correlation between the user operating the operated vehicle and the change in the condition of the operated vehicle; and communicate, via the computer network, the report to a remote computing device for presentation to a party authorized to grant the requested future use of the shared vehicle.

* * * * *